H. B. FEBIGER & J. C. FEBIGER, Jr.
NUT LOCK.
APPLICATION FILED MAY 9, 1908.
952,425.
Patented Mar. 15, 1910.
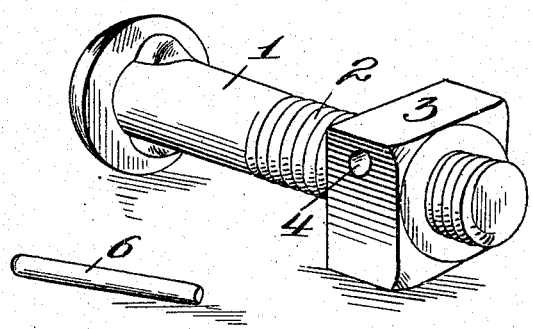
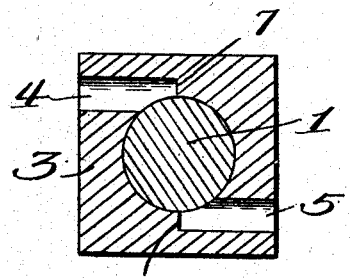
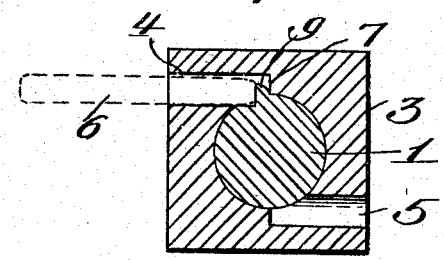
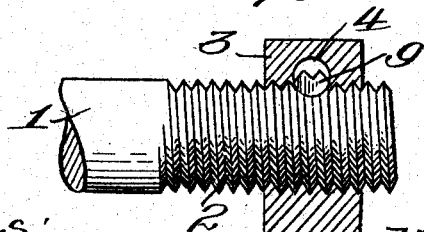
Witnesses:
Robert Waterman
Ernest Huguenot
Inventors
Henry B. Febiger
John C. Febiger Jr
By W. H. Cook
atty.

UNITED STATES PATENT OFFICE.

HENRY B. FEBIGER AND JOHN C. FEBIGER, JR., OF NEW ORLEANS, LOUISIANA.

NUT-LOCK.

952,425.  Specification of Letters Patent.  Patented Mar. 15, 1910.

Application filed May 9, 1908.  Serial No. 431,858.

*To all whom it may concern:*

Be it known that we, HENRY B. FEBIGER and JOHN C. FEBIGER, Jr., citizens of the United States, residing at New Orleans, Louisiana, have invented certain new and useful Improvements in Nut-Locks, of which the following is a specification.

Our present invention relates to improvements in nut locks and it has for its object primarily to provide an improved device of this character which is capable of use universally in connection with nuts and bolts of all ordinary constructions, and which in practice, serves to effectually lock the nut and bolt, the lock being of such a character that it will permit re-adjustment or removal of the nut without destroying the effectiveness either of the nut or bolt, and the nut may be locked irrespective of its angular position and whether or not the nut has been fully tightened, the improved lock rendering unnecessary the use of any part other than the ordinary nut and its coöperating bolt.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a nut and bolt provided with a lock constructed in accordance with our present invention, the tool adapted for use in making the lock being shown; Fig. 2 is a transverse sectional view of the bolt and the nut thereon, previous to the locking of these parts; Fig. 3 is a view similar to Fig. 2 showing the nut locked upon the bolt; and Fig. 4 represents an axial sectional view of the bolt and nut, the nut being locked.

Similar parts are designated by the same reference characters in the several views.

Nut locks constructed in accordance with our present invention are capable of application to nuts of all ordinary constructions, it being unnecessary to modify the construction of the nut or the bolt, or to use any special form of thread, the lock, according to the present invention, rendering it unnecessary to use any part in addition to the nut and bolt to which it is applied.

In the present embodiment of our invention, the same is shown applied to an ordinary bolt 1 having the usual threads 2 thereon, and an ordinary nut 3 is adapted to fit upon the threaded portion of the bolt. The nut is provided with one or more tool-receiving apertures, a pair of these apertures 4 and 5 being shown in the present instance which extend into the nut from the opposite sides thereof in order that the nut may be conveniently locked from either of these sides. These tool-receiving apertures may be of any appropriate size and shape, it being generally preferable to bore them with a drill so as to give them a substantially cylindrical form to receive a rounded pin or other appropriately shaped tool 6. These apertures extend into the nut in directions approximately tangential to the periphery or circumference of the threaded portion of the bolt, the inner end of each aperture terminating preferably midway of the nut or at a point where the axis of the aperture is normal to the axis of the bolt, the termination at the inner end of the apertures being preferably square or otherwise abrupt to form locking shoulders 7 and 8 for the respective apertures. These apertures are also preferably so formed as to extend inwardly in the direction in which the nut is turned in tightening it. By extending each of these apertures into the nut so that its axis is tangential or intersects the periphery of the threaded portion of the bolt and consequently the threaded bore of the nut, a portion of the threads or periphery of the bolt when inserted into the nut will protrude into each aperture, as shown in Fig. 2. After the nut has been turned until it occupies the desired position on the bolt, the tool 6 is inserted into one of the apertures. The inserted end of this tool will then engage that portion of the threads on the bolt which protrudes into the respective tool-receiving aperture, and by striking one or more blows by means of a hammer upon the outer end of the tool and in a direction axially thereof, the inner end of the tool will obtain a hold upon the protruding portion of the threads on the bolt after the manner of a chisel, that portion of the threads which protrudes into the aperture being plowed up to form a projection 9 which is pressed against the adjacent locking shoulder formed at the inner end of the respective aperture. The tool may then be removed and the nut, it will be found, is locked to the bolt so as to prevent relative rotation of these parts in either direction, any tendency of the nut to unscrew causing the locking shoulder at the inner end of the respective aperture to bear against the locking projection struck up from the bolt, and should the nut be only partially applied to the bolt, any tendency to turn the nut in a direction to tighten it, will cause the locking projection 9 struck up from the bolt to engage the inner walls of the aperture, relative rotation of the parts being thereby prevented. In some cases, it may be desirable to provide only one aperture, but it is generally preferable to provide two or more in order that the tool may be introduced and manipulated with the greatest convenience, irrespective of the angular position occupied by the nut, and if so desired, the tool may be introduced into both of these apertures in order to strike up a locking projection upon the bolt.

Our invention provides simple and improved means for locking nuts of any kind upon their coöperating bolts, it being only necessary to provide one or more of the tool-receiving apertures having the locking shoulders at the inner ends thereof, and after the nut has been locked, the tool is removed so that it is unnecessary to employ any parts in addition to the ordinary nut and bolt. Moreover, the locking projection struck up from the bolt serves to effectually prevent any ordinary tendency of the nut to rotate in either direction on the bolt, although the nut may be tightened to compensate for wear or elongation, or, it may be unscrewed and removed by means of a wrench without destroying the effectiveness of either the nut or the bolt, it being necessary only to re-insert a tool and strike up another locking projection on the bolt after the nut has been re-adjusted, and as the locking projection on the bolt has a positive engagement with the locking shoulder of the nut, there is no chance of these parts working loose, and corrosion of the parts does not impair the effectiveness of the nut or bolt or the locking engagement between them.

We claim as our invention:—

1. A device of the class described comprising a bolt and a nut thereon provided with an aperture extending inwardly in a direction tangential to the periphery of the bolt, the aperture having an end wall adjacent to the periphery of the bolt and providing a transverse locking shoulder arranged at a normal to the circumference of the bolt, and a portion of the periphery of the bolt being struck up in alinement with the aperture of the nut and lying against the locking shoulder at the inner end of said aperture to form a coöperating locking projection.

2. A device of the class described comprising a bolt, and a nut thereon provided with an aperture extending inwardly in a direction tangential to the periphery of the bolt, the aperture terminating within the nut to form an end wall arranged at a normal to the circumference of the bolt to form a transverse locking shoulder, and a portion of the periphery of the bolt being struck up in alinement with the aperture of the nut and coöperating with the said locking shoulder to form a locking projection.

In testimony whereof we have hereunto set our hands in presence of two subscribing witnesses.

HENRY B. FEBIGER.
JOHN C. FEBIGER, Jr.

Witnesses:
W. H. COOK,
ROBERT WATERMAN.